US006290809B1

(12) United States Patent
Bielfeldt et al.

(10) Patent No.: US 6,290,809 B1
(45) Date of Patent: Sep. 18, 2001

(54) APPARATUS FOR THE PRODUCTION OF BOARDS OF WOOD-BASED MATERIAL

(75) Inventors: Friedrich B. Bielfeldt, Paehl; Werner Hoffmann, Eppingen, both of (DE)

(73) Assignee: Maschinenfabrik J. Dieffenbacher, Eppingen (DE)

( * ) Notice: Subject to any disclaimer, the term of this patent is extended or adjusted under 35 U.S.C. 154(b) by 0 days.

(21) Appl. No.: 09/345,418

(22) Filed: Jul. 1, 1999

Related U.S. Application Data

(62) Division of application No. 09/071,778, filed on May 4, 1998, now Pat. No. 6,176,951.

(30) Foreign Application Priority Data

May 3, 1997 (DE) ............................................ 197 18 772

(51) Int. Cl.[7] ...................................................... B32B 31/00

(52) U.S. Cl. .................................... 156/380.9; 156/379.6; 156/580; 156/583.1; 156/583.5; 425/174.4; 425/371

(58) Field of Search ............................. 156/379.6, 379.9, 156/380.9, 580, 583.1, 583.5; 264/120, 113, 112; 425/174.4, 371

(56) References Cited

U.S. PATENT DOCUMENTS 3,712,971 * 1/1973 Admiraal .
4,018,642 4/1977 Pike et al. .
4,216,179 * 8/1980 Lamberts ............................ 264/119
4,456,498 * 6/1984 Churchland ...................... 156/273.7
5,433,905 7/1995 Tisch .
5,762,980 * 6/1998 Bielfeldt ............................... 425/372
5,892,208 * 4/1999 Harris et al. ...................... 156/272.2
5,989,468 * 11/1999 Lundgren ............................ 264/109

FOREIGN PATENT DOCUMENTS 21 137 63 9/1972 (DE) .
0 383 572 8/1990 (EP) .

* cited by examiner

*Primary Examiner*—Jeff H. Aftergut
(74) *Attorney, Agent, or Firm*—Foley & Lardner

(57) ABSTRACT

The invention relates to a process for the production of boards of wood-based material from a mixture of lignocellulose- and/or cellulose-containing particles mixed with a binder, the mat or pressed stock being preheated by means of high-frequency (HF) or microwave (MW) energy and, after transfer into a single or multi-platen press or a continuously operating press, being pressed and cured by the application of pressure and heat. To increase the preheating temperature of the pressed stock and to reduce the pressing factor, the following process steps are provided: (a) the preheating in the core of the mat of pressed stock to ≧85° Celsius takes place after or during the precompaction by traveling wave microwave energy and its reflection in an interaction between emitted and reflected energy into the center of the mat of pressed stock, a. focusing of the radiation energy into the center cross section being performed at a large energy-introduction and energy-absorption angle β, for an increased heat gradient, and (b) the preheated mat of pressed stock enters the pressing region of the press with a moisture content which is 15% to 30% less than the conventionally-controlled moisture content.

7 Claims, 4 Drawing Sheets

Section a-a

FIG. 4
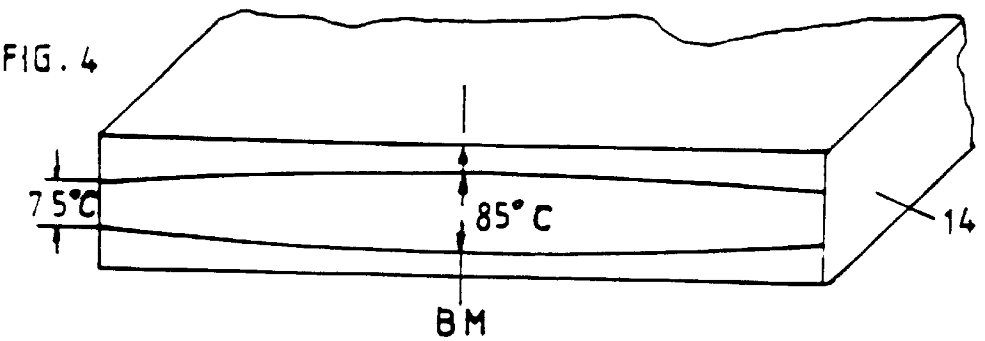
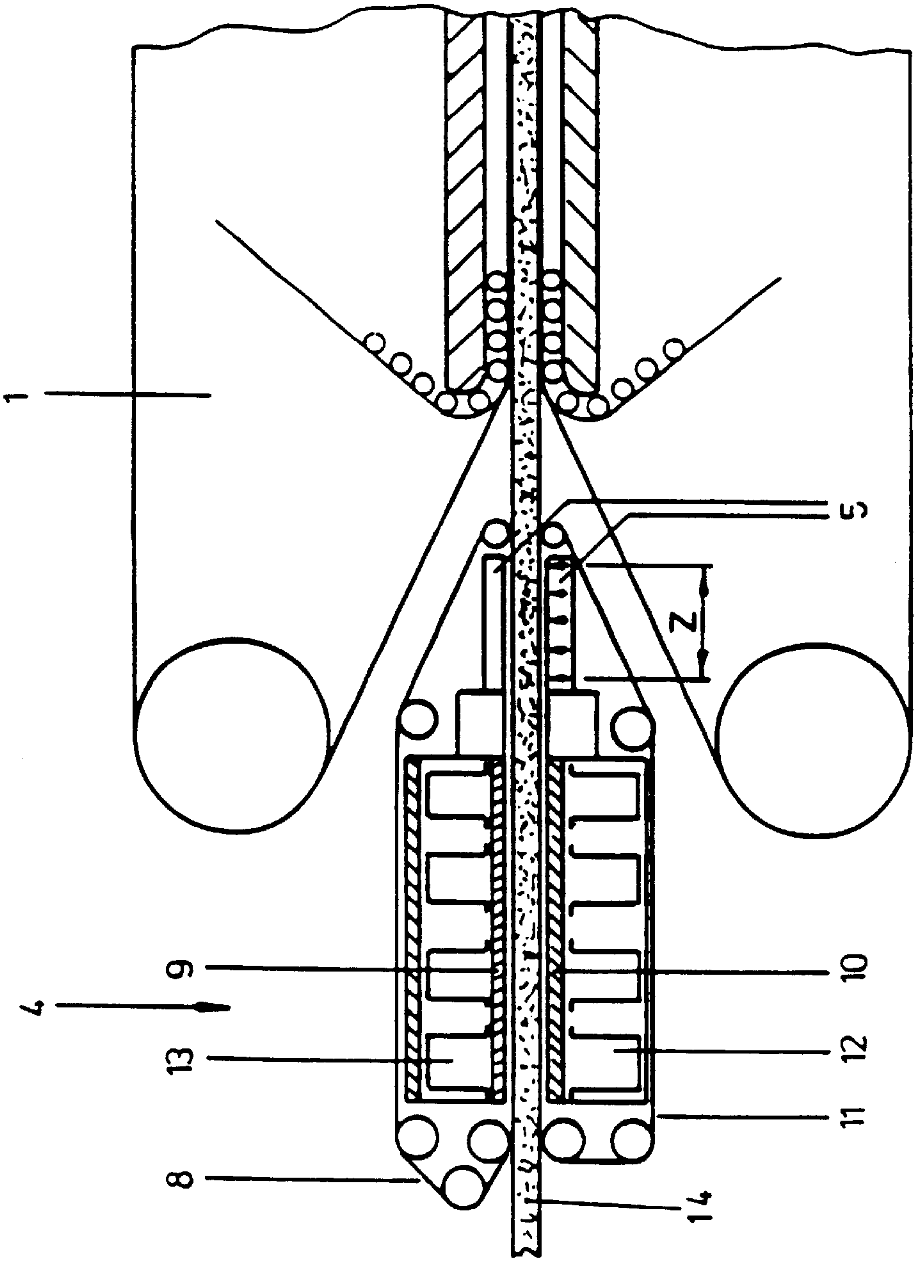
Fig. 3

APPARATUS FOR THE PRODUCTION OF BOARDS OF WOOD-BASED MATERIAL

This application is a divisional application of Ser. No. 09/071,778, filed May 4, 1998 now U.S. Pat. No. 6,176,951.

BACKGROUND OF THE INVENTION

1. Field of the Invention

The invention relates to a process for the production of boards of wood-based material, and t:o an installation for carrying out the process.

2. Description of Related Art

Application of the high-frequency technique as a means for preheating chip or fiber stock for the purpose of reducing the pressing factor during the subsequently initiated pressing operation to increase production output is generally known from the patent literature and general practical applications. It is known from U.S. Pat. No. 4,018,642 to use microwave as thermal energy for plywood, particle boards, chipboards and waffle boards, traveling waves being directed onto the pressed stock by means of so-called wave rectifiers at a frequency in the range from 100 to 10,000 Mhz. This U.S. Pat. 4,018,642 deals essentially with the preheating and curing of alkaline phenolic resins and similar glue compositions. Similar to the preheating mechanisms by microwave in food and kitchen technology, the energy utilization is ≦50%, which, for example in the application for preheating loosely laid mats of pressed stock, has the consequence that very long high-energy preheating zones are required, to be precise, depending on the height of the loosely laid stock, preheating zones in such high-frequency fields of 10 m to 20 m in length are used. Since the raising of the temperature gradient, for example from room temperature, takes place only very slowly and also brings about a drying out of the glues over the long preheating zone, and also with regard to premature gelling of the glues, a raising of the temperature is only possibly up to about 60° Celsius. The essentially application-specific problems and risks of high-frequency heating are non-uniform thickness of the mat of pressed stock, control difficulties of he high-frequency energy to be supplied and disruptive discharges occurring. To cope with these difficulties, specific compaction measures between the microwave stations are described in DE 21 13 763 B2.

The problem of the previous, conventional preheating of wood products by means of high-frequency of microwave energy is that the period of heating up takes too long, or the heating zone for achieving a pressed stock temperature of 80 to 85° Celsius, which is the aim, is too long. With a shallow energy-introduction and energy-absorption angle α, a further temperature increase in the core of the pressed stock must be stopped at just 60° Celsius, because with the binders (glues) used so far the chemical reaction for curing is initiated from only 60° Celsius, that is to say the glue/binder contained in the mat of pressed stock begins to cure before the pressed stock reaches the run-in of the heated press. Responsible for this is also the water moisture contained in the pressed stock, which turns into steam as heating up is continued and consequently accelerates the setting process. This means that the board of wood-based material produced over the pressing zone or pressing time must have gained in strength, at least from the 100° Celsius vapor point in the center of the mat of pressed stock up until it leaves the pressing zone or the press, corresponding to the setting zone X or the setting time X, to such an extent that when it leaves the press or the pressing zone the board has a transverse tensile strength which counteracts the residual vapor pressure still acting in the board. If the setting zone X or the setting time X is set too low, eruptions which destroy the surface and the product are produced as a result on leaving the pressing zone. Eruptions in the board of wood-based material can also be prevented by choosing the setting zone X to be appropriately long or the setting time X to be approximately great. With regard to production dependability, this means that either the pressing cycle in a platen cress or the steel belt speed of the continuously operating press must be reduced or a correspondingly longer cress must be constructed.

On the other hand, it is known from EP 0 383 572 A1 that, with the increased supply of energy caused by the steam shock, much shorter pressing factors or extremely short press lengths of a continuously operating press can be used. However, this is with the great: disadvantage that an inadequate counter-pressure builds up in the core of the board by means of steam, heat and pressure at the beginning of the pressing zone on account of the increased plasticity of the wood-based material in the board, with the result that the board produced has a completely inadequate transverse tensile strength in practical applications. For this reason, this process never reach industrial application.

SUMMARY OF THE INVENTION

The invention is based on the object of specifying a process with which the disadvantages and problems illustrated in the previous application of high-frequency or microwave energy are solved in that the degree of moisture of the mat of pressed stock before entry into the press is set such that, with a marked reduction in the pressing factor, by increasing the pressed stock preheating temperature to over 80° Celsius an adequate transverse tensile strength can be brought about within the pressing zone or the pressing time and the feeding and discharging of the mat of pressed stock into the microwave device and out of the microwave device must be arranged so optimally that a preheating of the pressed stock to over 80° Celsius is achieved in a short time, so that the beginning of the chemical reaction for the curing of the binder occurs in the region of the press or after the beginning of pressing.

The present invention provides a solution achieving this object. The solution achieving the set object for the process is defined such that the preheating in the core of the mat of pressed stock to ≧85° Celsius takes place after or during the precompaction by traveling wave microwave energy and its reflection in an interaction between emitted and reflected energy into the center of the mat of pressed stock, a focusing of the radiation energy into the center cross section being performed at a large energy-introduction and energy-absorption angle β, for an increased heating gradient, and the preheated mat of pressed stock enters the pressing region of the press with a moisture content which is 15% to 30% less than the conventional controlled moisture content.

In accomplishing the foregoing objects, there is provided according to the present invention a process for producing boards of wood-based material from lignocellulose and/or cellulose-containing particles mixed with a binder. The process comprises the steps of scattering the particles to form a mat of pressed material stock; compacting the mat;. preheating a core of the mat to ≧85° Celsius by traveling wave microwave energy and its reflection in an interaction between emitted and reflected energy into the mat, a focusing of the radiation energy being performed at a large energy-introduction and energy-absorption angle β for increasing a heating gradient through the mat; transferring the mat to a press; pressing and curing the mat by applying pressure and heat in the press.

In accomplishing the foregoing objects, there is provided according to the present invention an installation for producing boards of wood-based material from lignocellulose and/or cellulose-containing particles mixed with a binder. The installation comprises a scattering station for scattering the particles to form a mat of pressed stock; a preheating station for preheating the mat, and a press for applying pressure and heat to press and cure the mat. The preheating station including: a microwave heater including at least one generator and at least one reflector, the at least one generator and at least one reflector focusing on a center of thickness of the mat; a heat tunnel through which the mat runs, the heat tunnel being bounded above and below the mat by respective circulating belts maintaining the thickness of the mat, the belts passing over corresponding upper and lower non-conducting bounding plates; and an infeed device for adjusting spacing between the upper and lower non-conducting bounding plates and thereby setting spacing between the at least one reflector and the at least cone generator based on the thickness of the mat.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIG. 3 shows the microwave preheating device with steam feeding device.

FIG. 4 shows the cross section of the mat of pressed stock, with intensified introduction of heat in the center.

DETAILED DESCRIPTION OF THE PREFERRED EMBODIMENTS

Figure 1:
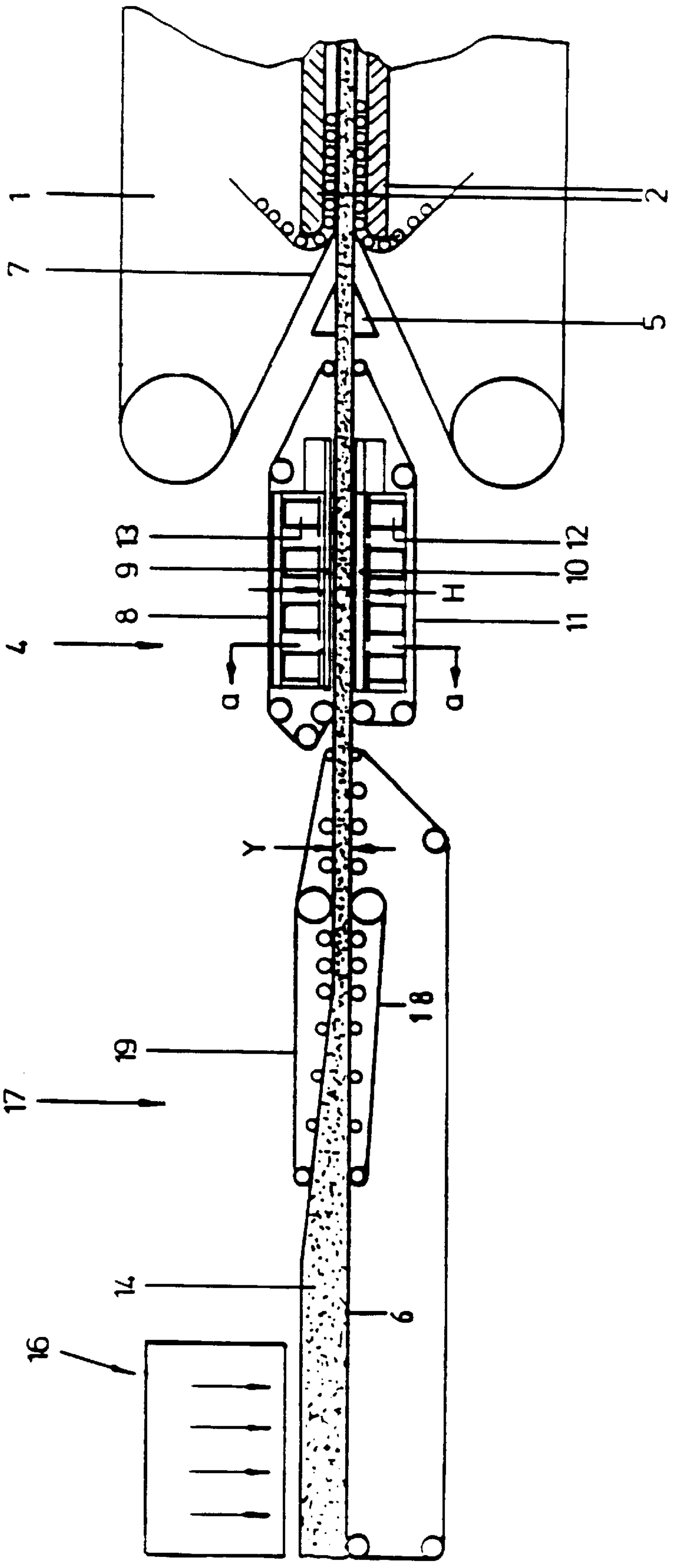
FIG. 1 shows in a diagrammatic representation the installation according to the invention for carrying out the process according to the invention.

In the drawings, the installation for carrying out the process is represented in an overall view and side view in FIG. 1. It comprises as its main parts the scattering station 16, from which the mat of pressed stock 14 is scattered onto the molding belt 6, a microwave preheating device 4 and the press 1. For explaining the invention, a continuously operating press 1, which is designed as a double belt press with circulating steel belts and heatable pressing/heating platens 2, has been arbitrarily chosen in the exemplary embodiment. The invention could also be described and used on a single or multi-platen press.

Figure 2:
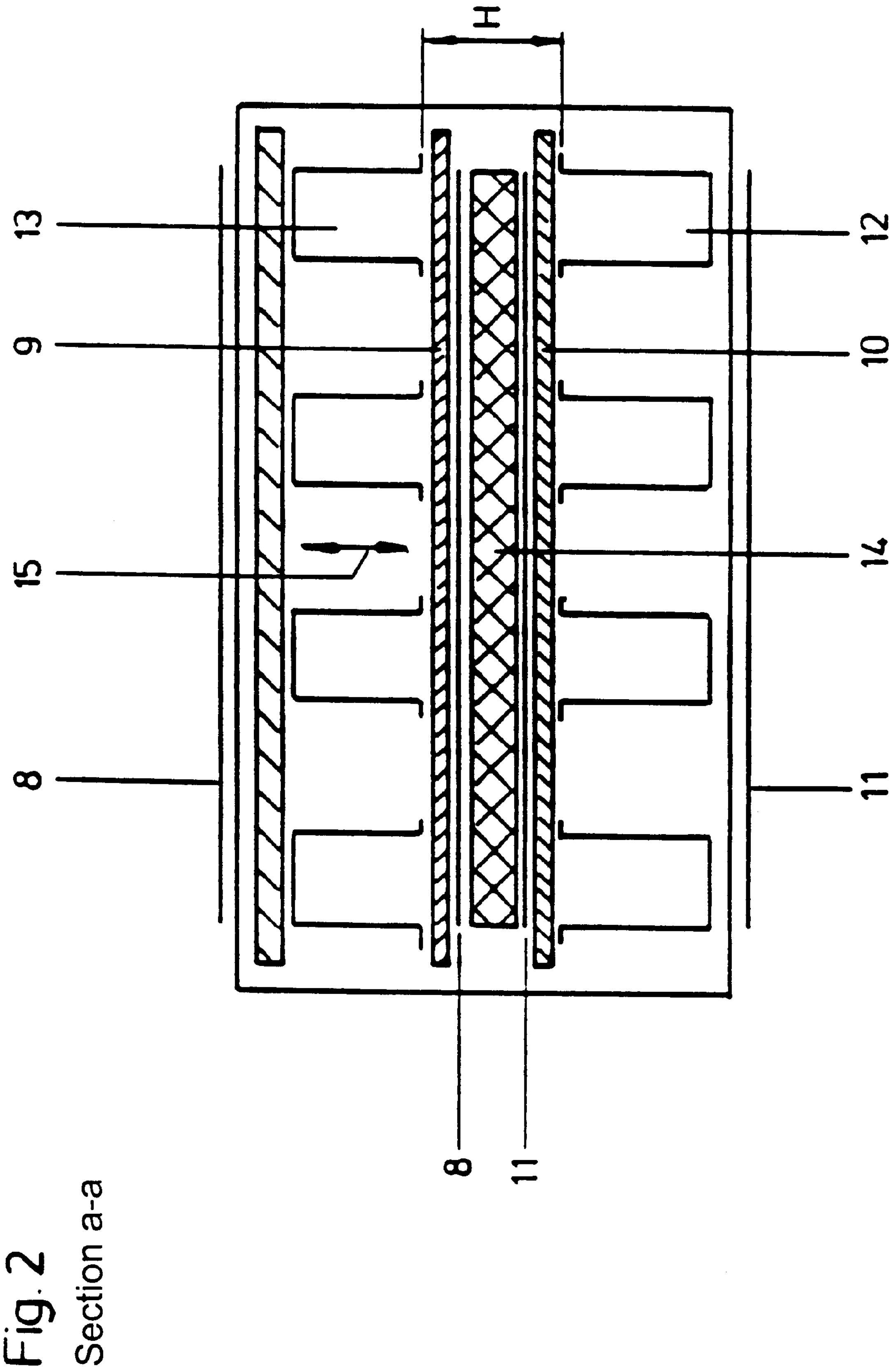
FIG. 2 shows a section a-a according to FIG. 1.

The microwave preheating device 4 is arranged directly before the running-in steel belts of the continuously operating press 1. If need be—depending on the planned end product—a steam feeding device 5 is provided between the run-out of the microwave preheating device 4 and the sloping steel belt run-in guide 7. In FIG. 2, section a—a, the assignment of the circulating plastic belts 8 at the top and the plastic belts 11 at the bottom with respect to the mat of pressed stock 14 and the generators 12 and reflectors 13 is represented for the microwave preheating device 4, to be precise the upper plastic belt 8 encloses the upper surface of the pressed stock and the plastic belt 11 encloses the lower surface of the pressed stock, both plastic belts 8 and 11 being passed over non-conducting bounding plates 9 and 10, designed as sliding plates, at a distance from the reflectors 13 and the generators 12 of about 20 mm. The distance H between the generators 12 and the reflectors 13 within the microwave preheating device 4 is 2 the height y of the loosely laid stock. Where the plastic belts 8 and 11 run through with the mat of pressed stock 14, these plastic belts 8 and 11 slide between the bounding plates 9 and 10. The distance H is set at the distance of the reflectors 13 from the generators 12 by means of an infeed device 15. The preheated mat of pressed stock 14 is enclosed at the top and bottom by the plastic belts 8 and 11, until it is taken right up to the steel belts of the continuously operating press 1, so that heat losses due to dissipation or drying-out losses are avoided. FIG. 3 shows alternatively, with the use of perforated or woven plastic belts 8 and 11, that the bridging or transfer zone with respect to the steel belts of the continuously operating press 1 can be used as a vaporizing zone for the upper and lower outer layer in a steam feeding device 5.

The running in of the mat of pressed stock 14 into the circulating plastic belts 8 and 11 of the microwave preheating device 4 is as follows:

1) for the production of a chipboard, a board of three or more layers is scattered onto the molding belt 6 by means of a scattering station 16. In the downstream precompacting device, the scattered mat of three or more layers is uniformly precompacted by means of a prepress 17 and fed to the plastic belts 8 and 11 of the microwave preheating device 4. In addition, a holding-down belt 19 may be brought in at the top between the prepress 17 and the plastic belts 8 and 11. This holding-down device, with a belt 18 correspondingly circulating underneath, has the effect in the prepress 17 that the height y of the mat of pressed stock created in the prepress 17 remains unchanged and consequently as small a distance as possible can be set between the generators 12 and the reflectors 13;
2) for the production of MDF hoards, the mat of pressed stock 14 is scattered as a single-layer structure onto the molding belt 6 from the scattering station 16, is precompacted in the prepress 17 and fed in turn by means of the belt 18 to the microwave preheating device 4, it being possible by the purposeful switching on of a steam feeding device 5 for a differentiated moisture setting to be brought about between the center layer and outer layer; and
3) for the production of OSB boards, glue is uniformly applied to the chippings and consequently a uniform moisture content is also set, but for reasons of strength the chippings are scattered in an orientation offset by 90% in three or more layers to form a mat of pressed stock 14 and are fed to the microwave preheating device 4 without the use of a prepress 17, it being possible in a way similar to in the case of MDF boards for a differentiated moisture content to be set between the center layer and outer layer by means of a steam feeding device 5. For vaporizing the upper and lower layer, the steam feeding device 5 comprises a tube profile arranged transversely over and under the mat of pressed stock 14, the steam being distributed onto the mat of pressed stock 14 uniformly onto the surfaces on top and underneath from this tube profile via steam nozzles. By means of this steam feeding device 5, the distance between the run-out of the microwave preheating device 4 from the steel belts of the continuously operating press 1 at the transfer can be kept very small, this steam system being designed at the same time as a transfer element to the steel belts of the continuously operating press 1.

FIG. 4 shows the cross section with the width B of the mat of pressed stock 14 with intensified introduction of heat by the generators 12 and the reflectors 13 into the longitudinal center and a falling temperature profile, for example from the center of the mat of pressed stock 14 at 85° to the edges of the mat of pressed stock 14 at 75° Celsius. As a result, a better devaporization from the center BM to the edge BR of the mat of pressed stock 14 is achieved, in a manner corresponding to the vapor pressure gradient.

The following table shows in the column on the right the reduction in the controlled moisture content of about 30° due to the process and the installation according to the invention.

TABLE

| Type of Board | Normal or varied with steam feeding | Region or type of mat of pressed stock | Previous process moisture content in % without preheating | Novel process: moisture content in % and reduced by 30% |
|---|---|---|---|---|
| Chipboard | normal | outer layer | 12–14 | ≈9 |
| | | center | 6–7 | ≈5.5 |
| layer | | | | |
| MDF board | normal | | 10–11 | ≈7.5 |
| | varied with steam feeding | fiber structure | | ≈5.5 |
| | 16 mm thickness and density = 650 to 720 kg/m$^3$ | | | ≈2.0 |
| OSB board | normal | | 6–7 | 4.5 |
| | varied with | chippinqs | | ≈3.5–4 |
| | steam feedinq | outer layer | | ≈2 |

Figure 5:
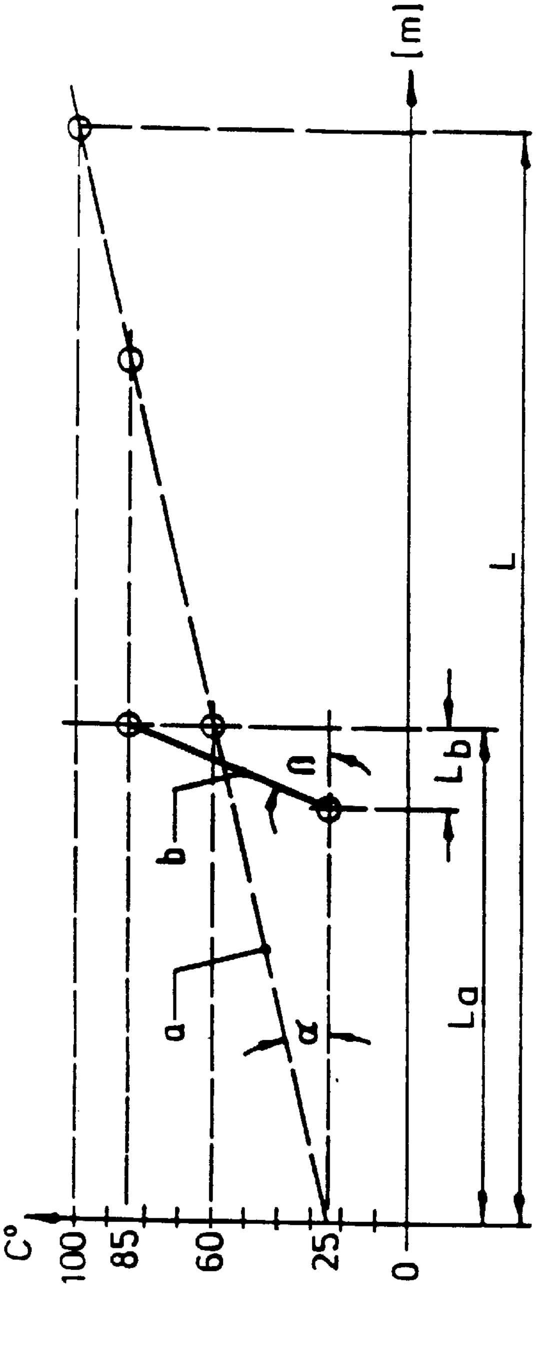
FIGS. 5–7 show diagrams to represent and compare the previous and inventive temperature and time profiles with respect to the mat of pressed stock.

In FIG. 5, L represents the overall pressing zone or pressing time, La represents the previous, conventional preheating zone or time and Lb represents the acting zone or time in the case of HF or microwave preheating with focused traveling wave microwave energy density according to the invention in the center of the mat of pressed stock 14. Also shown are the usable preheating zone, in degrees Celsius, the previous energy-introduction and energy-absorption angle, by the angel α, and the quick and short energy-introduction and energy-absorption angle possible according to the invention, by the angle β.

Figure 6:
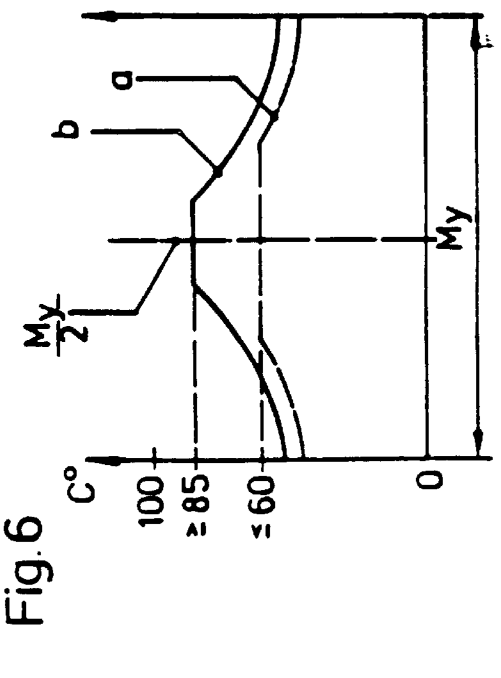
Figure 7:
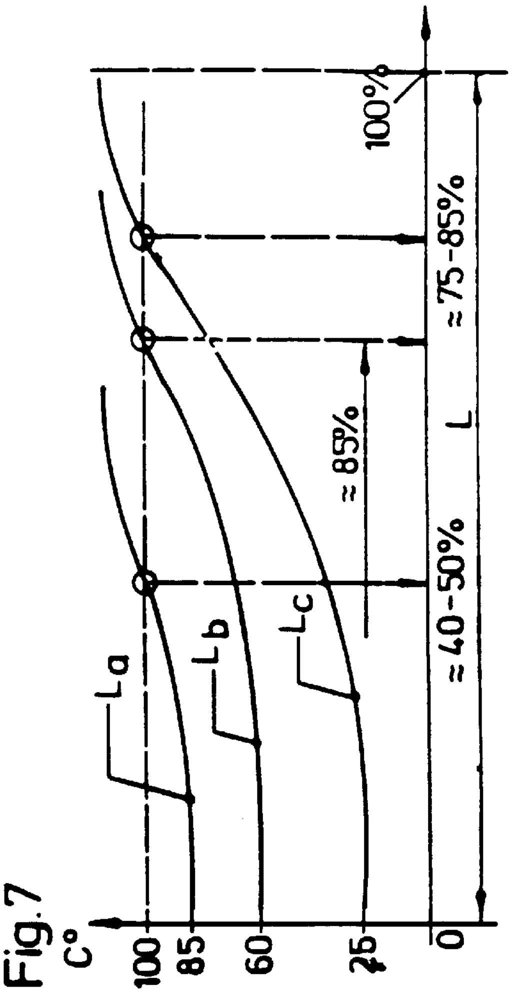

In FIG. 6, an orienting comparison is shown for the heat introduction in the width My of the mat of pressed stock 14, the curve a representing the previous temperature introduction and the curve b representing the temperature introduction according to the invention, in the cross section of the mat of pressed stock 14. In FIG. 7, a comparison is represented of the temperatures in degrees Celsius in the center of the mat of pressed stock with respect to the pressing zone L (100%) or the pressing time, in percent from the beginning of the preheating to the discharge from the continuously operating press 1, by La for the previous preheating and Lb for the profile with preheating according to the invention. The curve Lc shows the profile without preheating.

The following advantages are attributable to embodiments of the present invention. The effect of an increased microwave energy density in the center of the mat of pressed stock, brought about by the fact that the microwave energy not absorbed by the loosely laid stock is directed by additional microwave reflector surfaces and control devices back into the center of the mat of pressed stock in an interaction between emitted and reflected energy, causes the focusing of the wave energy to be in the core of the mat, with the result that the preheating temperature is reached in the core of the mat of pressed stock over a much shorter zone, to be precise in a ratio of about 10:1 in comparison with the previously known technology. Since the heating gradient, or the energy-introduction and energy-absorption angle β, is much greater for the introduction of the concentrated energy into the center of the board than the angle α in the conventional technology, according to practical tests so far a higher temperature level, to be precise of about 85° Celsius, can be drought about in the core of the loosely laid mat of pressed stock. Although there may be a premature onset of binder setting in the short time until 85° Celsius is reached, the remaining reaction time before the run-in of the continuously operating press, or until the beginning of the pressing cycle in a single- or multi-platen press, is negligible.

The application of previous high-frequency systems with a preheating of up to 60° Celsius has already brought about in practice an increase in production output of about 10% to 15%. Focusing the traveling waves in the center of the mat of pressed stock, in accordance with the present invention, achieves the effect that 85° Celsius in the core of the mat of pressed stock is obtained within a very short time. The. focusing of the radiation energy in the center of the mat of pressed stock has the effect that less heat is supplied to the outer layer region. When the pressed stock is introduced into the press, however, the supply of thermal energy from outside, for example from the heated steel belts, will quickly make up for the still absent thermal energy at the outer edges, so that as a result in the end a further reduction in the pressing factor, depending on the thickness of the board, in the region of up to about 50% can be achieved. This is brought about by shifting the 100° Celsius vapor point in the center of the mat of pressed stock in the direction of the beginning of the pressing zone. Without preheating, this 100° Celsius vapor point is at about 75% to 85% of the overall press length. The increased energy density causes this 100° Celsius vapor point to be shifted into the front region of the pressing zone, corresponding to about 35% to 50% of the pressing length or pressing time.

In terms of process technology, the presence of water moisture in the glue serves for heat transfer of the thermal energy introduced via the heated pressing belts, the water moisture in the outer layer region changing into steam, by means of the steel belts heated to over 200° Celsius, and the heat transfer into the center of the mat of pressed stock consequently being accelerated further by means of the vapor pressure. With the different boards of wood-based material, such as for example MDF OSE or chipboards, according to the prior art process-dependent degrees of controlled moisture content are set according to the type of glue and wood structure. A finding from the advantages illustrated is that: the extremely rapid and concentrated preheating to about 85° Celsius by the process according to the invention has the effect that less water moisture is required for heat transfer in the core of the loosely laid mat of pressed stock.

The reasons for this are firstly that less thermal energy from outside, in other words the press, has to be introduced into the pressed stock and secondly that the 100° Celsius vapor point in the center of the board occurs earlier, in the front region of the pressing zone. According to the process specified by the invention, approximately 15% to 30% less moisture compared with the normally customary controlled moisture content of 12% to 13% can be set, selective different settings of the moisture content in the core region and in the outer layer region being necessary according to the wood structure.

In the production of chipboards, MDF or OSB boards of three or more layers, in principle the outer layers are set to contain more moisture than the scattered center layer. Altogether, in the case of the process according to the invention, the moisture level can be reduced by about 15% to 30% for the outer layer region and center layer region as compared with the prior art.

In the production of chipboards, therefore, a selective raising of the moisture in the center of the mat of pressed stock up to 5.5% and in the outer layers to about 9% is performed after the preheating and shortly before entry into the press by applying water vapor to the outer layers.

In the production of MDF board, it is not always customary to scatter the mat of fibers in a multilayer structure that is to say a uniform loosely laid fiber structure is then used. In the case of previous processes with an average moisture content of about 10% to 11%, the moisture content could be lowered according to the invention to 7.5%. To reduce the pressing factor further, the total moisture content in the scattered material could advantageously be reduced to about 5.5 to 6% and the microwave preheating with increased energy concentration brought into the center of the pressed stock, with downstream vaporizing onto the outer layers of the mat of pressed stock. That is to say, by means of a vaporizing zone between microwave preheating arid, for example, the running-in steel belts of a continuously operating press, wet steam would be supplied to the surface (outer layer) of the mat of pressed stock, to be precise in a quantitative ratio of about 2%, by means of a steam jet tube arranged over the entire width, so that then in turn there would be set overall, and introduced into the press, a total moisture content of about 7.5%.

In the production of OSB boards, the chippings likewise partly have a uniform moisture structure, therefore here too, in a similar way to in the case of the MDF board, board production with an additional steam shock between microwave preheating and entry into a continuously operating press or the single- or multi-platen process can bring about an increase in output, the corresponding values for the center of the mat of pressed stock being a moisture content of about 3.5% to 4% and for the outer layers a moisture content of 4.5%.

Both in chipboard production and in the production of MDF or OSB boards, an application of water vapor may not be desired or possible for reasons of cost or other reasons. In this respect, however, care must be taken that the moisture values specified above are also dependably achieved when the mat of pressed stock enters the press of the three types of board. It is expediently proposed for this purpose that the scattering of the mat of pressed stock takes place with a 3% to 5% higher moisture content than is necessary for entry into the continuously operating press or the single- or multi-platen press, since the microwave preheating does not cause any appreciable reduction in the moisture content.

A further reason which can be given for the proposed lower moisture content in the mat of pressed stock is that, when applying the microwave preheating technique with focusing of the radiation energy in the center of the mat of pressed sock with the same controlled moisture content as previously customary in practical applications, the disadvantages from EP 0 383 572 A1, as described in the prior art, would occur. The increased plastification in the core of the mat of pressed stock would occur right at the beginning of the pressing zone or the pressing time, not allowing a sufficiently high transverse tensile strength to be achieved.

With the process according to the invention, the advantageous application of the microwave technique thus makes it necessary to operate with a reduced controlled moisture content, at least in the center of the mat of pressed stock, in order to bring about the increased counter-pressure during the pressing of the mat of pressed stock within a press, in particular at the beginning of the pressing operation, since with a lower moisture content there also occurs a lower plasticity in the material and this brings about a higher counter-pressure in the mat of pressed stock against the pressing action. Since a minimum moisture content is necessary for the chemical reaction of glue for it to set and bond the chips or fibers, it is consequently advantageous to operate with an increased moisture content in the outer layer region. With this increased moisture content in comparison with the core of the mat of pressed stock, steam develops in the outer layer regions immediately on entry into the press with the heated steel belt, or the pressing/heating platen, and then brings about a further heat transfer into the center of the mat of presses stock, so that as a result the 100° Celsius vapor point is reached even more quickly along the pressing zone or the pressing cycle and, with the distribution of the increased moisture from the outer layer, the overall effect is that the minimum moisture content required for the setting of the glue occurs uniformly over the entire cross section. The increased outer layer moisture advantageously counteracts a precuring at the outer layer surface on entry into the continuously operating press, or when starting the pressing cycle of a single-or multi-platen press. Since, however, less water moisture is required for the heat transfer into the core of the mat of pressed stock, the overall effect is consequently that the controlled moisture content can be set lower than with the conventional process technology. Furthermore, there is increased production dependability, because the lower moisture content provided by the process according to the invention virtually rules, out any risk of eruption on the finished board.

A further advantageous possibility of the process according to the invention is that, by means of the microwave preheating irradiating over the width of the mat of pressed stock, the energy density can be controlled in such a way that a temperature profile falling from, for example, 85° Celsius to 75° Celsius from the center to the edge of the mat of pressed stock can be brought about. This provides the advantage of better devaporization of the mat of pressed stock from the center into the edges over both longitudinal sides during the pressing cycle.

A further result and advantage of the process according to the invention which can be stated is that the combined process of microwave preheating with increased energy density by focusing the traveling waves in the center of the mat of pressed stock and a differentiated moisture distribution from the outside inward produces an accelerated penetration of heat into the core of the mat of pressed stock, in particular in the case of extremely thick boards in the range from 40 to 100 mm and more, so that in the end, according to tests which have been carried out, reductions in pressing times in the range from 40% to 50% can be achieved.

Process-dependently, for example with regard to the glue systems used in the case of OSB board production (alkaline phenolic resins) and in chipboard production (socyanates) or in the MDF board production, dependent on the fiber structure, the pressing tires can be drastically reduced by the process. Hence, according to practical applications with preheated chips, the following applies: per 1° Celsius temperature increase, an approximately 0.5% to 1% reduction in the pressing factor. Combined with differentiated moisture setting, for example with additional water or steam moistening of the outer layers, further 5% to 10% pressing factor reductions are achieved.

An advantageous installation for carrying out the process according to the invention. According to the prior art, the installation comprises a scattering station, a, microwave preheating device and a heatable press. According to the invention, the installation is constructed in such a way that the microwave preheating device comprises generators and reflectors arranged such that they are focusing on the center of the mat of pressed stock, the mat of pressed stock within the microwave preheating device running through a heat tunnel which is bounded at the top and bottom by circulating plastic belts and keeps the mat of pressed stock at a distance equal to the scattering height y, and both plastic belts are passed over non-conducting bounding plates made of plastic at a distance of in each case 20 mm from the generators and reflectors, and that the reflectors can be set varyingly in the distance H with respect to the generators, corresponding to the respective thickness of the pressed stock, with the upper bounding plate by means of an infeed device.

The advantage of the installation according to the Invention is that the microwave energy is introduced optimally, with an efficiency of over 90%, to achieve a controlled focusing in the core region of the mat of pressed stock, and that the microwave generators and reflectors are assigned directly to the surface of the mat of pressed stock, with only a small gap distance of ≦20 mm, that is to say the precompacted or loosely laid mat of pressed stock is passed in a controlled manner between the microwave generators and reflectors and the preheated mat of pressed stock is fed to the press directly after leaving the microwave device, without any heat less (dissipation), for the purpose of an installation which is optimum in terms of energy.

The priority document, German Patent Application 197 18 772.2 filed May 3, 1997 is incorporated by reference.

What is claimed is:

1. An installation for producing boards of wood-based material from lignocellulose and/or cellulose-containing particles mixed with a binder, the installation comprising:

a scattering station for scattering the particles to form a mat of pressed stock;

a preheating station for preheating the mat, the preheating station including:

a microwave heater including at least one generator and at least one reflector, the at least one generator and at least ore reflector focusing on a center of thickness of the mat;

a heat tunnel through which the mat runs, the heat tunnel being bounded above and below the mat by respective circulating belts maintaining the thickness of the mat, the belts passing over corresponding upper and lower non-conducting bounding plates; and an infeed device for adjusting spacing between the upper and lower non-conducting bounding plates and thereby setting spacing between the at least one reflector and the at least one generator based on the thickness of the mat; and a press for applying pressure and heat to press and cure the mat.

2. The installation as claimed in claim 1, wherein the at least one generator and the at least one reflector are spaced from a corresponding one of the upper and lower non-conducting bounding plates a distance of 20 millimeters.

3. The installation as claimed in claim 1, further comprising:

a molding belt for receiving the particles from the scattering station; and a prepress for acting on the mat and the molding belt, the prepress being provided between the scattering station and the preheating station.

4. The installation as claimed in claim 3, wherein the prepress includes an upper holding-down belt and a lower guiding belt, and wherein the molding belt and the holding-down belt are adapted for feeding the mat to a lower one of the circulating belts.

5. The installation as claimed in claim 1, further comprising:

a steam feeding device between the preheating station and the press.

6. The installation as claimed in claim 5, further comprising:

at least one perforated or woven belt extending from the preheating station through the steam feeding device.

7. The installation as claimed in claim 6, further comprising:

a prepress acting on the mat, the prepress being provided between the scattering station and the preheating station;

wherein one of the perforated or woven belts is calculated bearing against an upper side of the mat for holding the mat down through the prepress, the heating station, and the steam feeding device.

* * * * *